March 10, 1936. N. STRAUSSLER 2,033,493
SUSPENSION OF ROAD WHEELS OF VEHICLES
Filed Aug. 31, 1935
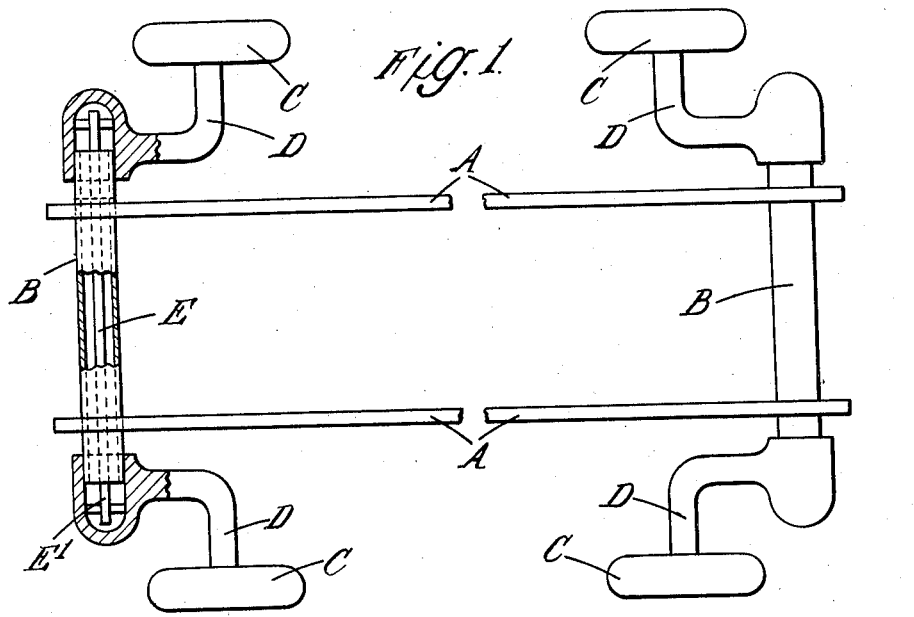
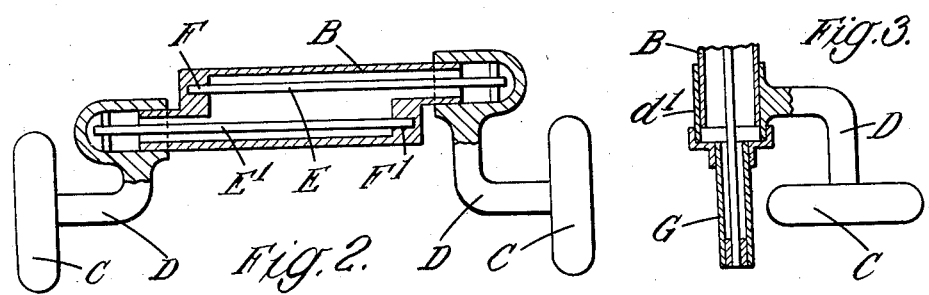
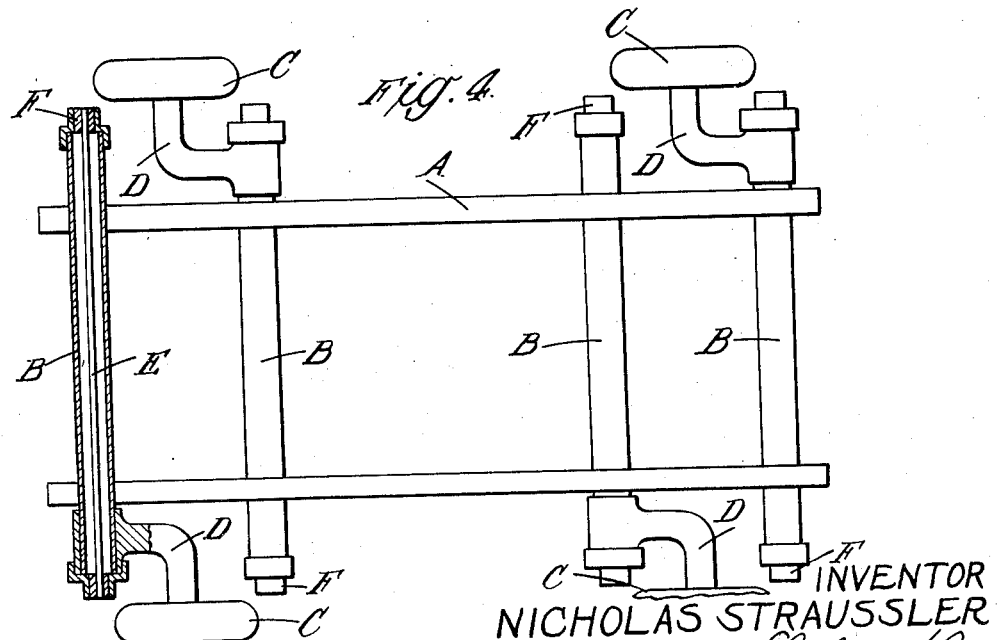
INVENTOR
NICHOLAS STRAUSSLER
BY Haseltine, Lake & Co.
ATTORNEYS Patented Mar. 10, 1936

2,033,493

UNITED STATES PATENT OFFICE 2,033,493

SUSPENSION OF ROAD WHEELS OF VEHICLES

Nicholas Straussler, London, England, assignor to Straussler Mechanization Limited, London, England, a British company Application August 31, 1935, Serial No. 38,723
In Great Britain January 25, 1934

4 Claims. (Cl. 280—124)

This invention relates to the suspension of road wheels of vehicles, of the kind in which each wheel is carried on a cranked arm and driven by gearing instead of from axles.

The suspension means employed are of the type in which torsion bars or shafts extending horizontally at right angles to the plane of movement of the wheels serve for springing the vehicle, that is, for resisting the transmission to the vehicle of shocks, vibrations, or oscillations set up by contact of the wheels with the road.

According to the invention each wheel is carried on a single cranked arm which has a separate arc of movement on one bearing, and is controlled by a torsion spring extending substantially the whole width of the vehicle chassis, or even beyond the wheel base transversely, and anchored at its end remote from the wheel, the two parallel springs either being housed one above the other in a single tube, or housed in separate tubes alongside each other, in which latter case the cranked arms of a pair of wheels are oppositely directed.

In order that the said invention may be clearly understood and readily carried into effect, the same will now be described more fully with reference to the accompanying drawing or diagrams illustrating several examples of the practical application of the invention.

Figure 1 represents in plan the chassis of a vehicle embodying the invention.

Figure 2 is a sectional elevation showing the arrangement of the vertically spaced parallel torsion shafts.

Figure 3 represents in plan a wheel with the torsion shaft extending laterally beyond the wheel base.

Figure 4 represents a plan of a chassis having parallel tubes and a modified arrangement of cranked arms carrying the wheels.

In the drawing, A indicates the longitudinal frame members of the chassis, which may be of tubular, channel, or any other suitable section. B indicates a series of cross tubes which may be either above or below the longitudinal members A, and C the vehicle wheels. Each wheel is supported on a single cranked arm D pivotally supported on one of the tubes B, the axis of the pivot being transverse in relation to the longitudinal axis of the vehicle and the parts of the arms D adjacent the pivots being approximately parallel to this longitudinal axis. Each arm D is rigidly secured to a resilient rod E or $E^1$, which at its end remote from the arm D is splined or otherwise rigidly secured at F or $F^1$ to one of the tubes B, and thus acts as a torsional spring, to which the load acting on the road wheels is transferred through the arm D. It will be seen that the spring base is much longer than the wheel base.

In the arrangement shown in Figure 3 the torsion shaft E extends laterally beyond the wheel C, and is connected with the annular part $d^1$ of the lever D by a tube G of resilient material, which gives an additional spring effect. The two torsion rods E of a pair of wheels may extend nearly to the full length of the tube B and be arranged one above another as seen in Figure 2; or each torsion rod may be housed in a separate tube B, as seen in Figure 4, in which case one of the arms D may be forwardly and the other rearwardly directed to position a pair of wheel hubs opposite each other.

What I claim and desire to secure by Letters Patent of the United States is:—

1. Suspension means for road vehicles comprising a pair of longitudinal frame members laterally spaced from each other, a plurality of tubes of a length greater than the distance between said longitudinal members attached transversely and in spaced relation to said longitudinal members, the surface of one outer end of each of said tubes being a bearing, a plurality of crank levers each having a solid end adapted to act as a spindle and having a hollow end, a wheel rotatably mounted upon each of said spindles, the hollow end of said levers being mounted for oscillatory movement on said bearing end of said tubes, one tortionally resilient member having a portion within each of said tubes and having one end rigidly attached to the hollow end of said levers, said tortionally resilient member being at least as long as said hollow member.

2. Suspension means for road vehicles as claimed in claim 1, said tortionally resilient member consisting of a tortionally resilient bar having an end extending beyond the outer end of said hollow member, a tortionally resilient tube about said outer end of said bar and having a closed end and an open end, the outer end of said bar and the closed end of said resilient tube being rigidly attached to each other and the open end of said resilient tube being rigidly attached to said lever.

3. Suspension means for road vehicles comprising a pair of longitudinal frame members laterally spaced from each other, hollow members attached transversely across the ends of said spaced frame members, each of said hollow members comprising two tubes rigidly attached one above the other in staggered relation and with the inner spaces in communication, whereby an outer end of each tube projects beyond the inner end of the tube to which it is attached and beyond said frame members, said projecting ends being bearings, a plurality of crank levers each having a solid end adapted to act as a spindle and having a hollow end, a wheel rotatably mounted upon each of said spindles, the hollow end of each of said levers being mounted for oscillatory movement on the projecting ends of said tubes, a tortionally resilient bar in each of said tubes having an inner end rigidly attached to the inner end of the tube and having the outer end rigidly attached within the hollow end of said levers.

4. Suspension means for road vehicles comprising a pair of longitudinal frame members laterally spaced from each other, at least four hollow members of a length greater than the distance between said longitudinal members having an open end and a closed end and arranged in pairs and attached transversely to said longitudinal members, the outer surface of alternate ends of the hollow members being bearings, at least four crank levers each having a solid end adapted to act as a spindle and each having a hollow end, a wheel rotatably mounted upon each of said spindles, the hollow ends of said levers being mounted upon the bearing ends of said hollow members in staggered relation, the levers on each pair of hollow members extending in opposite directions whereby the spindles of each pair lie in substantially the same transverse plane, a tortionally resilient bar in each of said hollow members having an end rigidly attached to the closed end of said tubes and having a second end rigidly attached within the hollow end of said levers.

NICHOLAS STRAUSSLER.